US008843375B1

(12) United States Patent
Ubillos

(10) Patent No.: US 8,843,375 B1
(45) Date of Patent: Sep. 23, 2014

(54) USER INTERFACES FOR EDITING AUDIO CLIPS

(75) Inventor: Randy Ubillos, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1143 days.

(21) Appl. No.: 12/340,477

(22) Filed: Dec. 19, 2008

Related U.S. Application Data

(60) Provisional application No. 61/101,066, filed on Sep. 29, 2008.

(51) Int. Cl.
  G10L 21/00 (2013.01)
  G10L 25/00 (2013.01)
  G11B 27/00 (2006.01)
  H04N 5/93 (2006.01)

(52) U.S. Cl.
  USPC ........... 704/270; 386/278; 386/285; 386/287; 704/278

(58) Field of Classification Search
  USPC .................................. 704/270, 278
  See application file for complete search history.

(56) References Cited

U.S. PATENT DOCUMENTS

| | | | | |
|---|---|---|---|---|
| 5,999,173 | A * | 12/1999 | Ubillos | 715/724 |
| 6,400,378 | B1 * | 6/2002 | Snook | 715/716 |
| 6,414,686 | B1 * | 7/2002 | Protheroe et al. | 345/474 |
| 6,597,375 | B1 * | 7/2003 | Yawitz | 715/723 |
| 6,628,303 | B1 * | 9/2003 | Foreman et al. | 715/723 |
| 6,807,361 | B1 * | 10/2004 | Girgensohn et al. | 386/227 |
| 7,062,713 | B2 * | 6/2006 | Schriever et al. | 715/723 |
| 7,295,752 | B1 * | 11/2007 | Jain et al. | 386/285 |
| 7,434,155 | B2 * | 10/2008 | Lee | 715/203 |
| 7,546,532 | B1 * | 6/2009 | Nichols et al. | 715/716 |
| 7,702,014 | B1 * | 4/2010 | Kellock et al. | 375/240.08 |
| 7,732,697 | B1 * | 6/2010 | Wieder | 84/609 |
| 7,954,065 | B2 | 5/2011 | Ubillos | |
| 7,992,097 | B2 * | 8/2011 | Ubillos | 715/793 |
| 8,009,966 | B2 * | 8/2011 | Bloom et al. | 386/285 |
| 8,744,249 | B2 * | 6/2014 | Lin | 386/353 |
| 2002/0069218 | A1 * | 6/2002 | Sull et al. | 707/501.1 |
| 2003/0002851 | A1 * | 1/2003 | Hsiao et al. | 386/52 |

(Continued)

FOREIGN PATENT DOCUMENTS

EP  1377047 A2 *  1/2004  ............. H04N 5/445

OTHER PUBLICATIONS iMovie '09—Precision Editor, YouTube [online], [retrieved on Feb. 27, 2014]. Retrieved from the Internet: http://www.youtube.com/watch?v=Bl1FLCkPOqE, 2 pages.

*Primary Examiner* — Douglas Godbold
*Assistant Examiner* — Michael Ortiz Sanchez
(74) *Attorney, Agent, or Firm* — Fish & Richardson P.C.

(57) ABSTRACT

Methods, systems and apparatus for editing audio clips. A computer-implemented method includes displaying in a user interface, a first audio clip including a first plurality of time instants and a second audio clip including a second plurality of time instants; displaying a first transition point identifier associated with the first audio clip to designate a portion from a beginning of the first audio clip to the first transition point identifier that is playable; displaying a second transition point identifier associated with the second audio clip to designate a portion from the second transition point identifier to an end of the second audio clip that is playable; and generating a combined audio clip comprising the portion from the beginning of the first audio clip to the first transition point identifier and the portion from the second transition point identifier to the end of the second audio clip.

42 Claims, 7 Drawing Sheets

(56) References Cited

U.S. PATENT DOCUMENTS

| | | | |
|---|---|---|---|
| 2003/0206596 A1* | 11/2003 | Carver et al. | 375/240.26 |
| 2004/0170385 A1* | 9/2004 | Bhadkamkar et al. | 386/68 |
| 2005/0217462 A1* | 10/2005 | Thomson et al. | 84/612 |
| 2006/0224940 A1* | 10/2006 | Lee | 715/500.1 |
| 2006/0265657 A1* | 11/2006 | Gilley | 715/730 |
| 2007/0044010 A1* | 2/2007 | Sull et al. | 715/500.1 |
| 2007/0223878 A1* | 9/2007 | Abe et al. | 386/95 |
| 2008/0016245 A1* | 1/2008 | Cunningham et al. | 709/246 |
| 2008/0027682 A1* | 1/2008 | Herberger et al. | 702/185 |
| 2008/0126191 A1* | 5/2008 | Schiavi | 705/14 |
| 2008/0152298 A1* | 6/2008 | Ubillos | 386/52 |
| 2008/0155421 A1* | 6/2008 | Ubillos et al. | 715/724 |
| 2008/0288869 A1* | 11/2008 | Ubillos | 715/716 |
| 2009/0288010 A1* | 11/2009 | Ubillos | 715/720 |

* cited by examiner

USER INTERFACES FOR EDITING AUDIO CLIPS

CROSS-REFERENCE TO RELATED APPLICATIONS

This application claims the benefit of priority under 35 U.S.C. 119(e) to U.S. Provisional Patent Application Ser. No. 61/101,066, filed on Sep. 29, 2008. The disclosure of the prior application is considered part of, and is incorporated by reference in, the disclosure of this application.

TECHNICAL FIELD

In general, this disclosure relates to systems and methods for editing audio clips in a visual user interface.

BACKGROUND

Both scenes in motion and audio tracks can be captured and recorded using a variety of devices ranging from state-of-the-art professional video cameras used in television and movie-production to simple cameras included in mobile telephones. Some of the devices that can be used to capture motion pictures and audio tracks, including digital camcorders and digital cameras, also allow storing the captured images and sounds in a digital format, such as one of the Moving Pictures Experts Group (MPEG) formats. Further, depending on device capabilities and user settings, a camera can be configured to capture and store both audio and video data. The recorded information can be automatically stored in digital format and can be easily transferred to a secondary device, including fixed or removable media associated with a computer. The transfer can be performed using any of various wired or wireless communications protocols, such as over Bluetooth® or through a universal serial bus (USB) based device.

Video and audio editing software, such as iMovie® HD 6.0.1, provided by Apple, Inc. (Cupertino, Calif.), provides users with the capability to perform non-linear editing techniques for editing raw video and audio footage. Such editing can include cutting one or more segments from the footage, re-arranging segments, combining multiple segments, or adding content to the footage, such as voice-overs, titles, and transitions.

SUMMARY

The present disclosure relates to editing audio clips and to visual interfaces and techniques for performing the editing. In one example, a user interface can be configured to display one or more bounded regions in a single row. Each bounded region can represent an audio clip that includes multiple time instants. Further, each bounded region can include a left edge and a right edge, which represent the beginning and end of the audio clip, respectively. Collectively, the one or more audio clips can represent an audio editing project.

The present inventor recognized a need to provide a system for editing audio clips in a graphical environment. Further, the present inventor recognized the need to associate a transition point with a time instant of an audio clip such that playback of the audio clip terminates at the transition point. A transition point can be selectively positioned at any time instant between the left edge and the right edge of a bounded region. In some implementations, the last time instant in an audio clip can be selected as the default transition point. In response to input, an audio clip can be played back in the user interface. Playback can start at the beginning of an audio clip and proceed until the time instant that corresponds to the transition point is reached. When a transition point is reached, playback transitions to a corresponding audio clip or terminates.

In one aspect a computer-implemented method includes displaying in a user interface a first audio clip including a first plurality of time instants and a second audio clip including a second plurality of time instants. A first transition point identifier associated with the first audio clip, wherein the first transition point identifier is movable to any time instant in the first audio clip to designate a portion from a beginning of the first audio clip to the first transition point identifier that is playable, is displayed. A second transition point identifier associated with the second audio clip, wherein the second transition point identifier is movable to any time instant in the second audio clip to designate a portion from the second transition point identifier to an end of the second audio clip that is playable, is displayed. A combined audio clip comprising the portion from the beginning of the first audio clip to the first transition point identifier and the portion from the second transition point identifier to the end of the second audio clip is generated.

This and other aspects can include one or more of the following features. A selection of a time instant in the first audio clip can be detected. The first transition point identifier can be associated with the selected time instant. The first audio clip from the beginning to the first transition point identifier can be played. The second audio clip from the second transition point identifier to the end can be played. A transition marker linking the first transition point identifier and the second transition point identifier can be presented. A first video clip corresponding to the first audio clip and a second video clip corresponding to the second audio clip can be displayed in the user interface. A video transition marker that intersects the first and second video clips, wherein the video transition marker is aligned with the transition marker can be displayed in the user interface. The first transition point identifier can be moved to a time instant in the first audio clip that precedes the video transition marker. The second transition point identifier can be aligned with the first transition point identifier. The first transition point identifier can be moved to a time instant in the first audio clip that is subsequent to the video transition marker. The second transition point identifier can be aligned with the first transition point identifier. The first audio clip can be displayed in a first row and the second audio clip can be displayed in a second row vertically displaced from the first row. The combined audio clip can be saved to a file. At least one of a preceding audio clip to the left of the first audio clip and a succeeding audio clip to the right of the first audio clip can be displayed. The first audio clip between the beginning and the first transition point identifier can be visually emphasized.

In one aspect a computer-implemented method includes displaying in a user interface display region a plurality of bounded regions each displaying respective audio clips. Included in the user interface display region is at least a first bounded region displaying a first audio clip and a second bounded region displaying a second audio clip. A transition marker that intersects the first and second bounded regions is displayed in the user interface display region. The transition marker defines a first transition point in the first audio clip and a second transition point in the second audio clip. The first transition point corresponding to a first intersection of the transition marker and the first bounded region. The second transition point corresponding to a second intersection of the transition marker and the second bounded region. User input is received to alter one or both of the first and second transition points by visually effecting relative movement between one or more of the first audio clip, the second audio clip and the transition marker.

This and other aspects can include one or more of the following features. An edited audio clip including a portion of the first audio clip ending at the first transition point followed by a portion of the second audio clip beginning at the second transition point can be displayed.

Particular implementations of the subject matter described in this specification can be implemented to realize one or more of the following potential advantages. For example, the techniques can be implemented such that multiple audio clips can be displayed in the same user interface to permit simultaneous editing, such as through combining portions of the multiple audio clips. In addition, the content of each of the multiple audio clips can be displayed. Moreover, a transition point can be associated with an audio clip to provide for a seamless transition to the next audio clip. For example, playback of a first audio clip can cease at the time instant associated with a transition point and playback of a second audio clip can commence. The techniques also can be implemented such that a transition point can be associated with any time instant in an audio clip. Additionally, the user interface can be implemented to permit combining multiple audio clips to form a single, blended audio clip. Furthermore, multiple audio clips, including the blended audio clip, can be displayed in the same user interface.

The audio editing software application can be configured to permit saving an edited audio clip as a separate project, such that the audio clips from which the edited audio clip was created remain unaltered. The techniques also can be implemented such that audio clips and video clips can be displayed in the same user interface. The techniques further can be implemented to permit associating one or more audio clips with one or more video clips, such that playback of a video clip coincides with playback of one or more corresponding audio clips.

Details of one or more implementations are set forth in the accompanying drawings and the description below. Other aspects can be implemented in systems and computer program products, encoded on a computer-readable medium, operable to cause data processing apparatus to perform such operations. Other features, aspects, and advantages of the disclosure will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
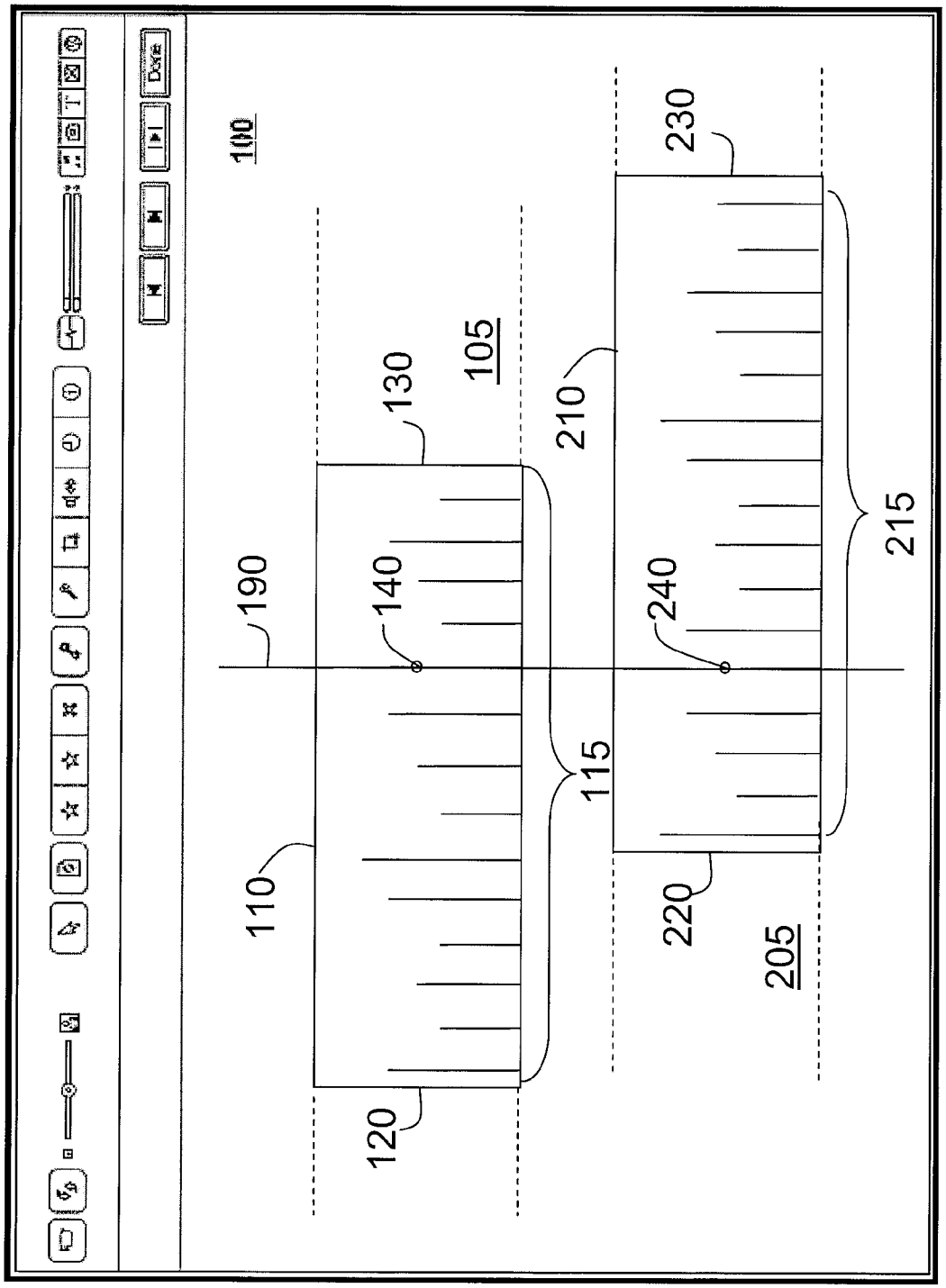
FIGS. 1-3 show editing audio clips in an exemplary user interface.

FIG. 1 shows editing audio clips in an exemplary user interface 100. The user interface 100 is provided by an audio editing software application installed, e.g., on a computer system, through which a user can listen to, view, edit, or otherwise process one or more audio clips by accessing the audio clips in the user interface 100. In addition, the user interface 100 can be provided by a video editing software application installed on a computer system through which a user can view, edit, manipulate or otherwise process one or more video clips by accessing the video clips in the user interface 100. In some implementations, the user interface 100 can be used to view, edit, manipulate or otherwise process one or more audio clips and one or more video clips. The audio clips can be represented as bounded regions, or thumbnails, when displayed in the user interface 100. An audio clip (or audio segment) can be a complete audio work, such as a whole song, or a portion of an audio work, such as a sample or sound-bite. Each audio clip can be saved on a storage device operatively coupled to the computer system on which the audio editing software application is installed. Alternatively, one or more audio clips can be uploaded into the user interface 100 from a portable storage device or over a communication network. A user can import one or more audio clips into the user interface 100, such as for use in an editing project.

A first audio clip 110 can be displayed in a work space of the user interface 100. The first audio clip 110 can include a plurality of time instants 115 representing the data used to generate a corresponding audio signal. For example, a time instant can have an associated amplitude component that represents an audio signal value at a point in time. Further, a time instant can represent a particular measure of time, such as 1/30 of a second. In some implementations, the duration of the time instants can vary within an audio clip.

The first plurality of time instants 115 can be distributed within the first audio clip 110 between the left edge 120 and the right edge 130. In response to receiving a playback input, the audio editing software application can be configured to play back the first audio clip 110 by sequentially accessing the time instants from the left edge 120 to the right edge 130.

A first transition point 140 also can be included in the first audio clip 110. The first transition point 140 can be associated with any time instant in the first audio clip 110. In some implementations, the last time instant in an audio clip can be selected as the default position of the transition point. In other implementations, an audio clip can have no transition point until one is specified. Playback of the first audio clip 110 can be terminated when the first transition point 140 is reached. Thus, any time instants in the first audio clip 110 that are located to the right of the first transition point 140 are not played back. Further, the first transition point 140 can be repositioned by selecting, e.g., clicking on, a new time instant in the first audio clip 110. The first transition point 140 can be represented in the user interface 100 by a graphical identifier, which is denoted as a circle in FIG. 1. Alternatively, the first transition point 140 can be represented using any other graphical identifier, such as a square, a diamond, a line, a plane, a panel, or other such symbol. In some implementations, a separate graphical identifier can be omitted and the time instant associated with the transition point can be visually distinguished through shading, weight, or other such convention.

The first transition point 140 can provide a visual reference for editing by identifying the portion of the first audio clip 110 to be played. For example, the first audio clip 110 can be played from the first time instant, such as the time instant nearest the left edge 120, through the first transition point 140. Thus, editing can be fine tuned by permitting the first transition point 140 to be associated with any time instant included in the first audio clip 110.

The first transition point 140 can be graphically repositioned, such as by selecting and dragging the associated graphical identifier within the first audio clip 110. Thus, the first transition point 140 can be disassociated from the current time instant and associated with a different time instant included in the first audio clip 110. For example, the first transition point 140 can be selected and dragged to any point within the first audio clip 110. Upon being dropped, the first transition point 140 can be associated with the closest neighboring time instant. Alternatively, a user can select, e.g., click on, a time instant in the first audio clip 110 in order to associate the first transition point 140 with that time instant. The first audio clip 110, as presented in row 105 of the user interface 100, also can be preceded by one or more other audio clips. In some implementations, the first transition point 140 can be repositioned such that it corresponds to a time instant included in a preceding audio clip.

Further, one or more of the audio clips in the row 105, including any audio clips preceding the first audio clip 110, can be skimmed by positioning, e.g., a cursor, on the one or more audio clips. During skimming, one or more time instants can be manually accessed by positioning the cursor on the one or more audio clips in order to playback and/or display values associated with the time instants. In some implementations, a separate skimming indicator can show the one or more time instants being skimmed. Additional details about skimming functionality can be found in U.S. Utility application Ser. No. 11/771,761, filed Apr. 6, 2004, entitled "Two Dimensional Timeline Display of Media Items," the entire contents of which are incorporated herein by reference.

The user interface 100 also can include a second audio clip 210, which can be presented in a second row 205. The second audio clip 210 also can include a plurality of time instants 215, which can represent one or more values associated with the second audio clip 210. The second audio clip 210 can include a left edge 220 and a right edge 230, which represent the beginning and end of the second audio clip 210, respectively. In response to receiving a playback input, the audio editing software application can be configured to play back the second audio clip 210 by sequentially accessing the included time instants from the left edge 220 to the right edge 230. In some implementations, the user interface 100 can present three or more rows, each row including at least one audio clip and at least one transition point.

The second audio clip 210 can have a second transition point 240 that identifies the time instant at which playback is to begin. Any time instant located to the left of the transition point 240 in the second audio clip 210 is not played back. As with the first transition point 140, the second transition point 240 can be repositioned to correspond with any time instant in the second audio clip 210. In some implementations, the second transition point 240 can be assigned a default position corresponding to the first time instant in the second audio clip 210. Thus, in the default case, each time instant in the second audio clip 210 will be played back.

The first audio clip 110 and the second audio clip 210 also can be played in combination. For example, upon receiving input initiating playback of the audio clips in rows 105 and 205, the first audio clip 110 can be played from the beginning to the first transition point 140 and then the second audio clip 210 can be played from the second transition point 240 to the end. Playback of the first and second audio clips 110 and 210 can be continuous, so that there is no discernable delay at the transition point. Further, the time instants positioned to the right of the first transition point 140 in the first audio clip 110 and the time instants positioned to the left of the second transition point 240 in the second audio clip 210 are not played back. Additionally, playback can be controlled in the user interface 100 through one or more media playback buttons, such as play, pause, stop, rewind, and fast-forward. Other controls also can be included in the user interface 100, such as buttons associated with presenting, editing, and manipulating an audio editing project. Moreover, each of the editing and playback operations can be performed on any audio clip accessible in the user interface 100.

Further, the first transition point 140 and the second transition point 240 can be aligned to further graphically represent the transition from the first audio clip 110 to the second audio clip 210. For example, the second transition point 240 can be positioned directly below the first transition point 140, or vice versa. Nonetheless, in some implementations, the first transition point 140 can be positioned independent of the second transition point 240 in the user interface 100. For example, selecting and dragging the first transition point 140 in row 105 can be performed without affecting the position of the second audio clip 210 or the second transition point 240 in row 205.

The first transition point 140 and the second transition point 240 also can be linked by a transition marker 190, such as a vertical bar that passes through the first audio clip 110 and the second audio clip 210. Although in some implementations each transition point can be positioned independently, the transition marker 190 can tie the first and second transition points 140 and 240 together. Thus, the transition marker 190 can act as a singular control for adjusting the transition from the first audio clip 110 to the second audio clip 210. Therefore, repositioning the transition marker 190 can result in simultaneously changing the position of the first transition point 140 and the second transition point 240. For example, selecting and dragging the transition marker 190 to the left in the user interface 100 simultaneously repositions the first and second transition points 140 and 240 to the left in the respective audio clips. Moreover, selecting and dragging the transition marker 190 to the left in the user interface 100 reduces the playable portion of the first audio clip 110 while simultaneously increasing the playable portion of the second audio clip 210 by a corresponding amount.

In some implementations, selecting a new transition point in an audio clip can cause the audio clip to shift relative to the user interface 100. For example, the first audio clip 110 can automatically shift relative to the transition marker 190 when the first transition point 140 is repositioned, so as to maintain the vertical alignment between the first transition point 140, the transition marker 190, and the second transition point 240.

An audio clip, such as the first audio clip 110 or the second audio clip 210, can be represented in the user interface 100 using any shape, including rectangles, lines, and waveforms. Further, an audio clip can include information pertaining to the duration of the audio clip. In some implementations, the duration of an audio clip can differ from the duration of one or more other audio clips. For example, the first audio clip 110 can have a duration of 32 seconds and the second audio clip 210 can have a duration of 47 seconds. The duration of an audio editing project can be defined by the aggregate duration of all the audio clips included in playback.

Figure 2:
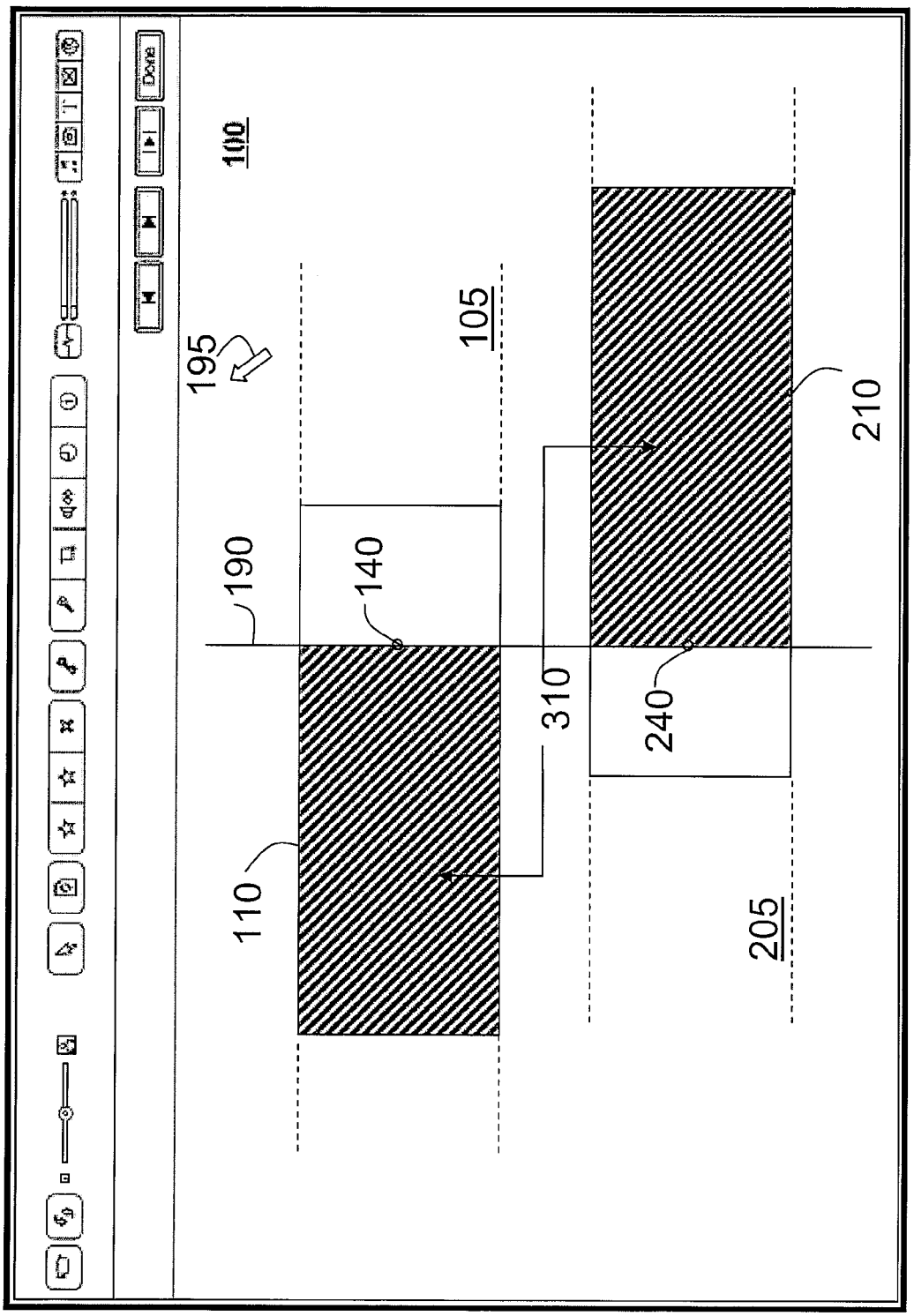

FIG. 2 shows editing audio clips in an exemplary user interface 100. Upon receiving a playback input in the user interface 100, a portion of the first audio clip 110 and a portion of the second audio clip 210 can be played back. For example, the first audio clip 110 can be played from the beginning to the first transition point 140 and the second audio clip 210 can be played from the second transition point 240 to the end. Further, the portion of the second audio clip 210 can be played immediately after playback of the portion of the first audio clip 110 ends, such that the transition between the portions is seamless. Moreover, the portion of the first audio clip 110 from the beginning to the first transition point 140 and the portion of the second audio clip 210 from the second transition point 240 to the end can be combined to form a third audio clip 310. As shown in FIG. 2, the third audio clip 310 is illustrated by a diagonal line pattern. The third audio clip 310 can be stored as a separate file on a local or a remote storage device. Additionally, the first audio clip 110 and the second audio clip 210 can remain unaltered.

In some implementations, the audio clip played can be selected based on the position of the cursor 195 in the user interface 100. For example, the third audio clip 310 can be played if the cursor 195 is located outside of the rows 105 and 205 when the playback input is received. Alternatively, the first audio clip 110 or the second audio clip 210 can be played if the cursor 195 is located in row 105 or 205, respectively, when the playback input is received. Moreover, if the cursor 195 is located in a row when the playback input is received, the one or more corresponding audio clips can be played in their entirety and any transition points can be ignored.

Additionally, a portion of an audio clip can be highlighted or otherwise emphasized to indicate that it is playable. For example, and for the purpose of illustration only, the portion of the first audio clip 110 between the beginning and the first transition point 140 can be highlighted using a diagonal line pattern to indicate the portion that has been selected for playback. Any graphical technique can be used to identify the emphasized portion, including coloring, shading, shadowing, outlining, and projection. Alternatively, a portion of an audio clip can be deemphasized to indicate that it has not been selected for playback. For example, the portion of the first audio clip 110 between the first transition point 240 and the end can be dimmed or otherwise deemphasized. Any graphical technique also can be used to identify the deemphasized portion, including transparency, translucency, shading, shadowing, and cropping.

Figure 3:
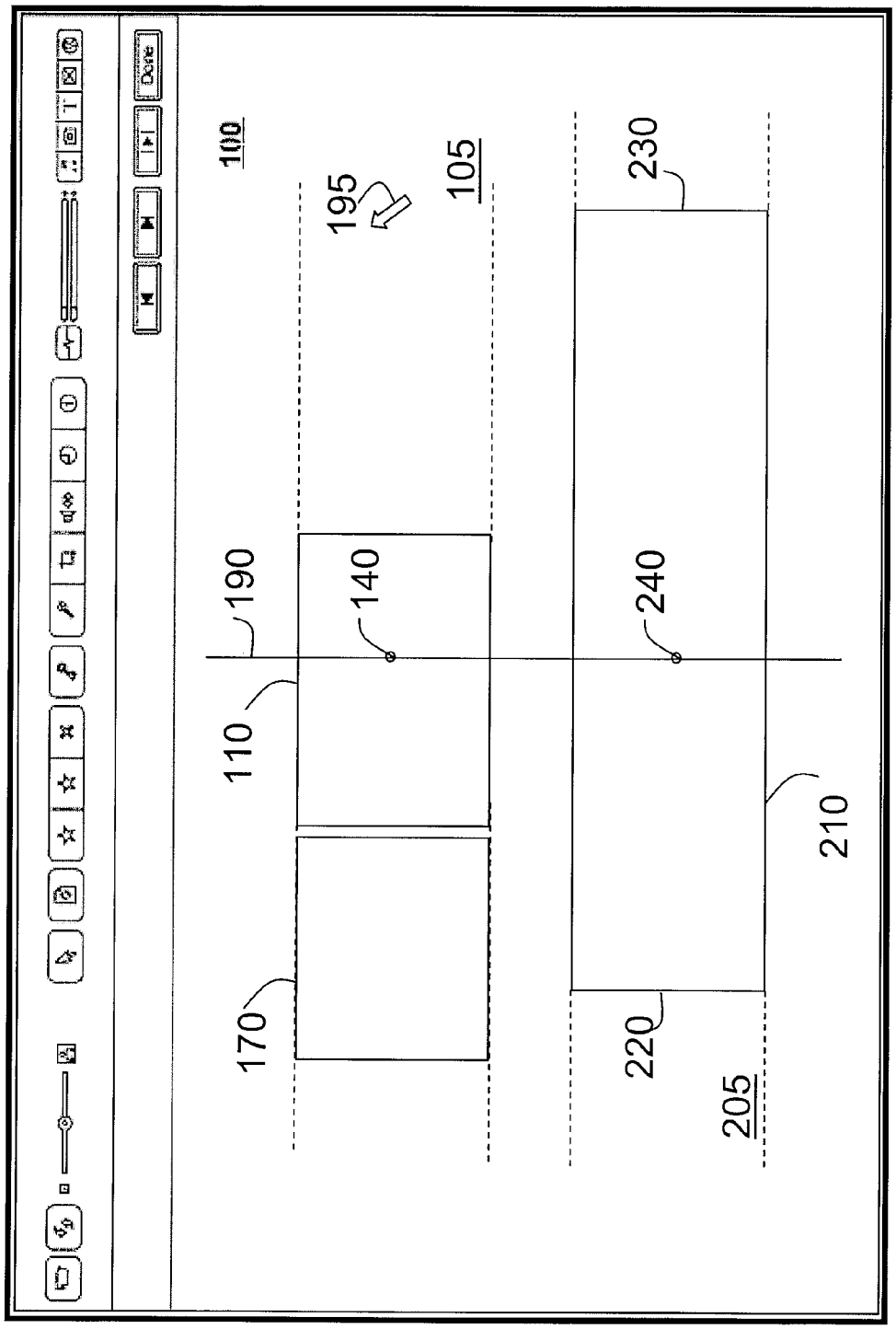

FIG. 3 shows editing audio clips in an exemplary user interface 100. The row 105 including the first audio clip 110 also can include one or more additional audio clips. For example, a preceding audio clip 170 can be presented to the left of the first audio clip 110. In some implementations, a succeeding audio clip can be presented to the right of the first audio clip 110. If a playback input is received when the cursor 195 is positioned in the row 105, each of the audio clips in the row 105 can be played back in succession. Further, each audio clip or portion thereof positioned to the left of the first transition point 140 in the row 105 can be emphasized. Similarly, each audio clip or portion thereof positioned to the right of the second transition point 240 in the row 205 also can be emphasized. Thus, each of the audio clips and portions of audio clips that will be played in response to a playback input received outside of a specific row can be visually distinguished.

Further, the one or more audio clips displayed in a row can be altered in response to user input. For example, the first audio clip 110 can be selected and dragged in row 105 toward the left boundary of the user interface 100. In some implementations, one or more additional audio clips that are temporally subsequent to the first audio clip 110 can be displayed when the first audio clip 110 is dragged toward the left boundary of the user interface 100. Additionally, one or more audio clips that come before the first audio clip 110, including the preceding audio clip 170, can be partially or completely displaced by the repositioning of the first audio clip 110. Further, the first audio clip 110 can be dragged toward the right boundary of the user interface 100 to reveal one or more additional preceding audio clips.

In some implementations, an audio clip can be moved into a different row of the user interface. For example, if the second transition point 240 is repositioned from the second audio clip 210 to a temporally succeeding audio clip in row 205, the second audio clip 210 can be automatically shifted into row 105. Further, one or more audio clips that precede the second audio clip 210 also can be moved to row 105. Similarly, the first audio clip 110 can be moved to row 205 if the first transition point 140 is repositioned to a preceding audio clip in row 105.

Figure 4:
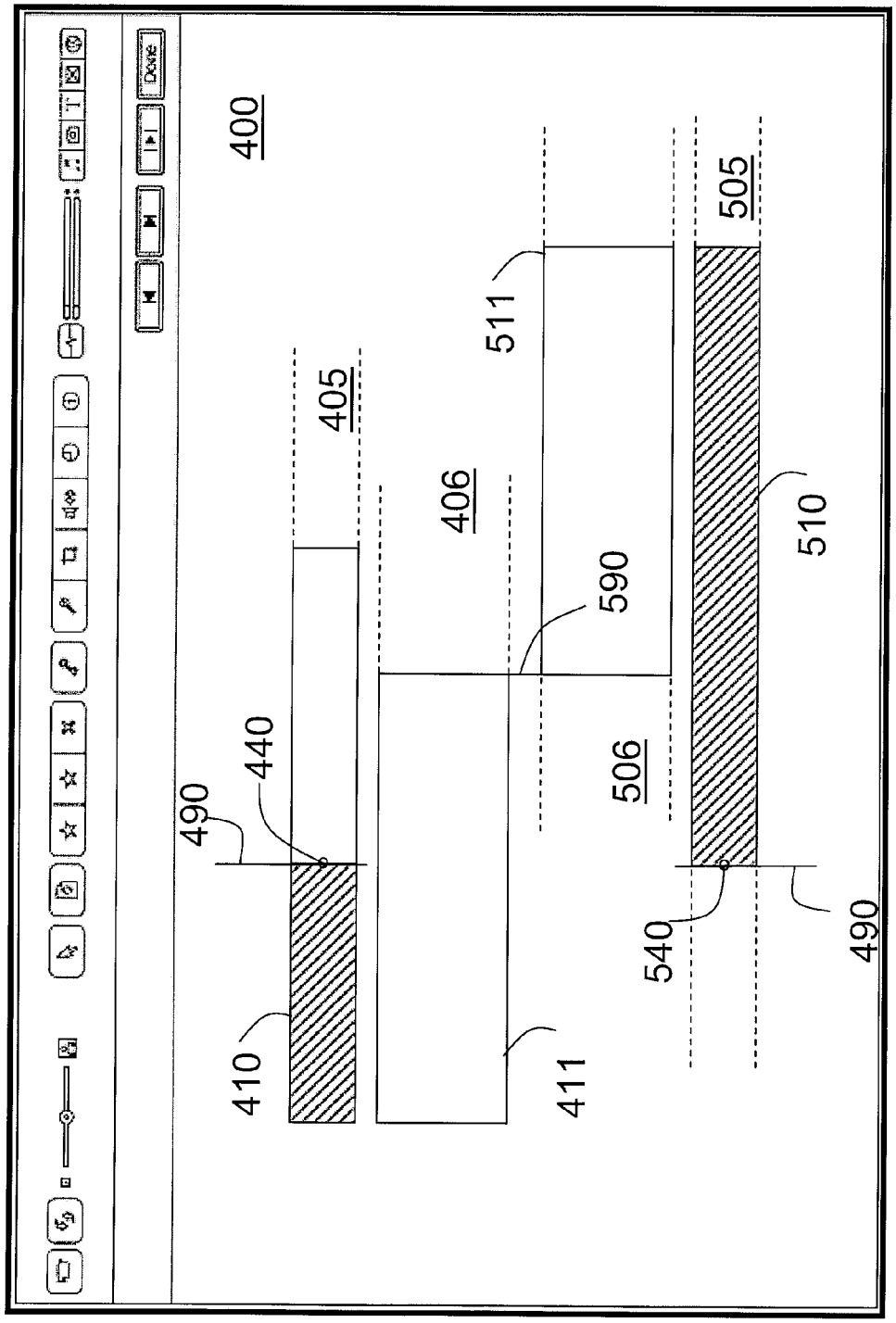
FIGS. 4 and 5 show an exemplary interface for editing audio clips in conjunction with one or more video clips.

FIG. 4 shows an exemplary user interface 400 for editing audio clips in conjunction with one or more video clips. The audio clips can contain audio data that was recorded simultaneously with the video clips. For example, a video clip and an audio clip of a concert can be recorded simultaneously using a recording device, e.g., a camcorder. Alternatively, the audio clips can contain audio data that was not recorded in conjunction with the video clips. For example, one or more video clips of the concert can be associated with one or more audio clips containing commentary relating to the concert. The one or more audio clips and one or more video clips can be arranged such that they can be played back simultaneously. Alternatively, one or more audio clips and or video clips can be played back independently.

The user interface 400 can include a first audio clip 410, a second audio clip 510, a first video clip 411, and a second video clip 511. Further, the first audio clip 410 can correspond to the first video clip 411 and the second audio clip 510 can correspond to the second video clip 511. The first audio clip 410 can be displayed in a row 405 and the second audio clip 510 can be displayed in a separate row 505. The first video clip 411 can be displayed in a row 406 and the second video clip 511 can be displayed in a separate row 506. In some implementations, playback of the first video clip 411 can commence simultaneously with playback of the first audio clip 410. Likewise, in some implementations, playback of the second video clip 511 can commence simultaneously with playback of the second audio clip 510. A video transition marker 590 can represent a transition point between the playback of the first video clip 411 and the second video clip 511. In some implementations, an audio transition marker 490 can be positioned separately from the video transition marker 590. In some other implementations, the audio transition marker 490 can be aligned with the video transition marker 590.

Upon receiving a playback input, the first video clip 411 can be played back until the video transition marker 590 is encountered. Further, playback of the first audio clip 410 can begin simultaneously with playback of the first video clip 411 and can continue until the audio transition marker 490 is encountered. Because the respective transition markers can be independent, playback of the first audio clip 410 can transition to playback of the second audio clip 510 while the first video clip 411 is playing. This is an audio editing technique known as a "J-cut." In a J-cut, images from the first video clip 411 can be selected for presentation with audio content from the second audio clip 510. Similarly, playback of the second audio clip 510 can continue while playback of the first video clip 411 transitions to playback of the second video clip 511. Thus, playback of video clips and audio clips in the user interface 100 can be decoupled.

Further, the audio transition marker 490 can be moved in the user interface 400 without moving the video transition marker 590. Thus, the time at which one audio clip transitions to another with respect to a video clip can be graphically adjusted. Additionally, the duration for which an audio clip plays relative to a video clip also can be graphically adjusted.

Figure 5:
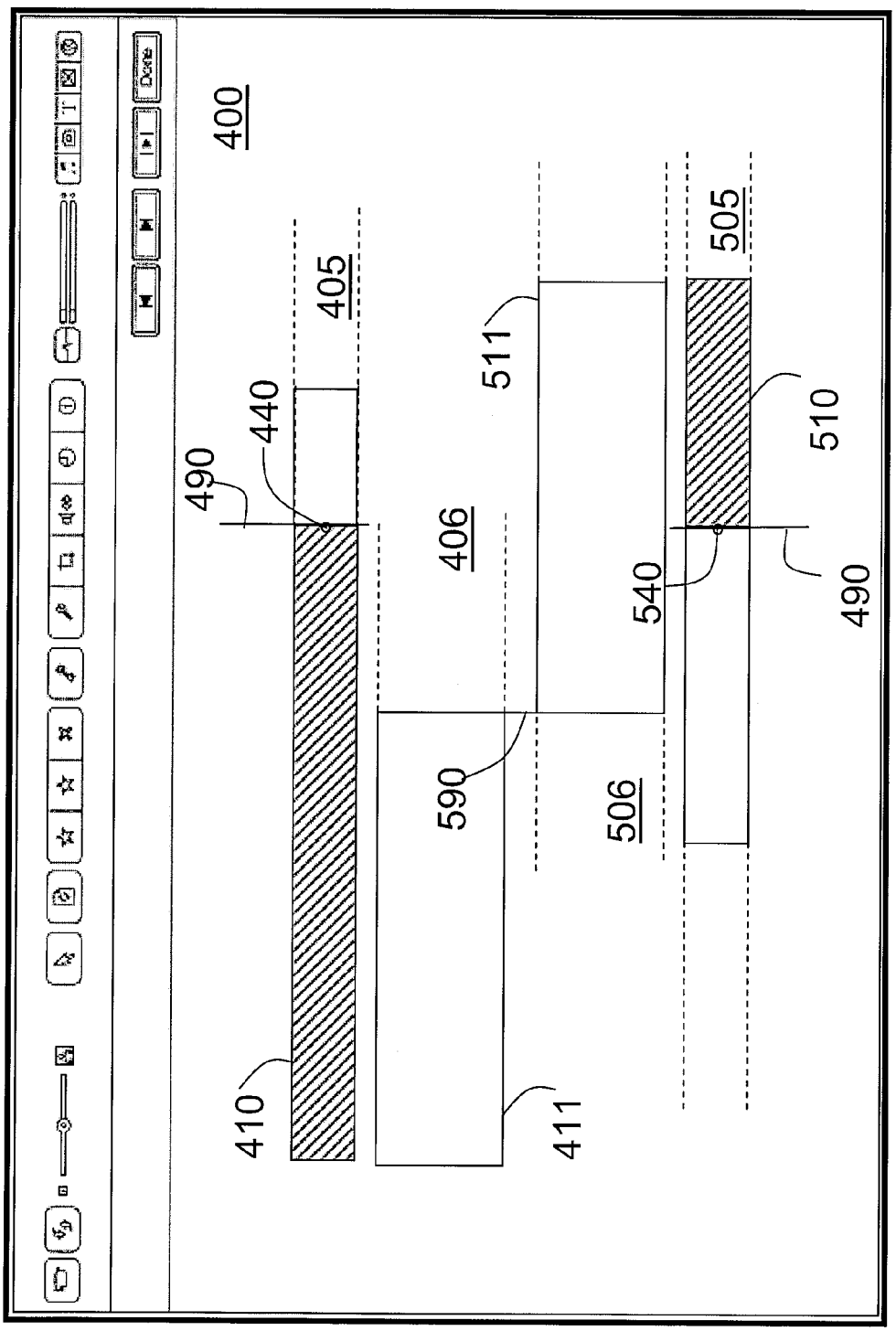

FIG. 5 shows an exemplary user interface 400 for editing audio clips in conjunction with one or more video clips. In FIG. 5, playback of the second audio clip 510 begins after playback of the second video clip 511 is initiated. This is an audio editing technique known as an "L-cut." In an L-cut, images from the second video clip 511 can be presented while audio from the first audio clip 410 continues to be played. As discussed with respect to FIG. 4, the audio transition marker 490 can be independently moved to the right relative to the video transition marker 590. As the audio transition marker 490 is moved, the quantity of the first audio clip 410 to be played back increases, while the quantity of the second audio clip 510 to be played back decreases by a proportionate amount. Thus, because the audio transition marker 490 ties the first transition point 440 and the second transition point 540 together, the total duration of the audio editing project can remain constant.

Figure 6:
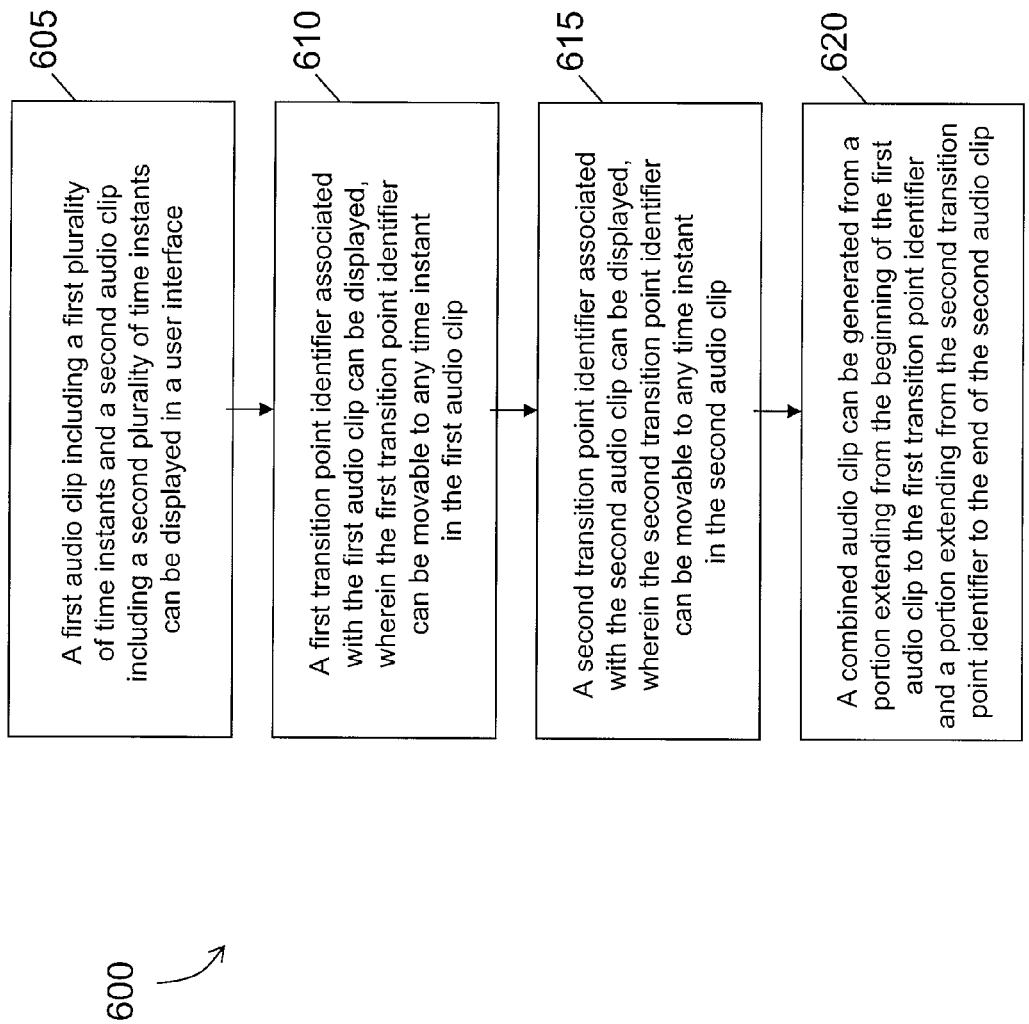
FIG. 6 shows a flow diagram describing an exemplary process for editing audio clips.

FIG. 6 shows a flow diagram of an exemplary process 600 for editing audio clips. The process 600 can, for example, be implemented in the user interface 100 or 400, as depicted in FIGS. 1-5. A first audio clip including a first plurality of time instants and a second audio clip including a second plurality of time instants can be displayed in a user interface (605). The user interface can be a graphical user interface provided by an audio editing software application installed on a computer system. A user can interact with the user interface through one or more input devices, such as a keyboard, mouse, or touch screen. A user can listen to, view, edit, manipulate or otherwise process one or more audio clips by accessing the audio clips in the user interface, e.g., as one or more bounded regions. An audio clip can include any audio data, including voices, notes, beats, sounds, noise, and any combination thereof. Each audio clip represented in the user interface can have a left edge and a right edge. The left and right edges can be implemented to represent the duration of the audio clip. For example, in response to a playback input, a playhead can progress through the audio data included in the audio clip from the left edge to the right edge, such that the audio clip is played sequentially from beginning to end. The duration of an audio clip can be variable and also can depend on user input.

A first transition point identifier associated with the first audio clip can be displayed, wherein the first transition point identifier can be movable to any time instant in the first audio clip (610). The first transition point identifier can graphically represent a first transition point at which playback of the first audio clip is terminated. In some implementations, the first transition point identifier can be associated by default with the last time instant of the first audio clip. The first transition point identifier can be implemented as a graphical marker, a modification to a displayed time instant, or can have no visual representation. Further, a user can reposition the first transition point identifier to correspond to any point in the first audio clip. For example, a user can select and drag the first transition point identifier to a new position within the first audio clip. Alternatively, a user can select a particular time instant with which the first transition point identifier is to be associated.

A second transition point identifier associated with the second audio clip also can be displayed, wherein the second transition point identifier can be movable to any time instant in the second audio clip (615). The second transition point identifier can graphically represent a second transition point at which playback of the second audio clip is to begin. In some implementations, the second transition point identifier can be associated by default with the first time instant of the second audio clip. The second transition point identifier can be implemented as a graphical marker, a modification to a displayed time instant, or can have no visual representation. Further, a user can reposition the second transition point identifier to correspond to any point in the second audio clip. For example, a user can select and drag the second transition point identifier to a new position within the second audio clip. Alternatively, a user can select a particular time instant with which the second transition point identifier is to be associated.

The second transition point identifier can be vertically aligned with the first transition point identifier in the user interface, such as by positioning the second transition point identifier below the first transition point identifier. Further, the first transition point identifier and the second transition point identifier can be linked by a transition marker, such as a vertical bar, that intersects the first audio clip and the second audio clip. When linked by the transition marker, the first and second transition point identifiers can be moved in unison, such that they remain aligned. Alternatively, the first transition point identifier and the second transition point identifier can be moved independently of the transition marker. For example, the transition marker can be anchored in the center of the user interface and the first transition point identifier can be moved independently of the second transition point identifier.

A combined audio clip can be generated from the first audio clip and the second audio clip. The combined audio clip can comprise a portion extending from the beginning of the first audio clip to the first transition point identifier and a portion extending from the second transition point identifier to the end of the second audio clip (620). The combined audio clip can be played in the user interface. For example, in response to receiving a playback input, the combined audio clip can be played sequentially, without interruption or delay. Additionally, the audio editing software application can indicate the playback progress of an audio clip using a playhead to sequentially traverse the audio clip representation in the user interface. The playhead can be implemented as a line, an arrow, a dot, a circle, a plane or other such graphical icon.

In response to receiving playback input corresponding to the combined audio clip, the selected portion of the first audio clip can be continuously played back from the beginning to the first transition point identifier and the selected portion of the second audio clip can be played back from the second transition point identifier to the end. Additionally, a user can manipulate playback, e.g., pause, stop, rewind or fast-forward, by interacting with one or more controls associated with the audio editing software application.

Figure 7:
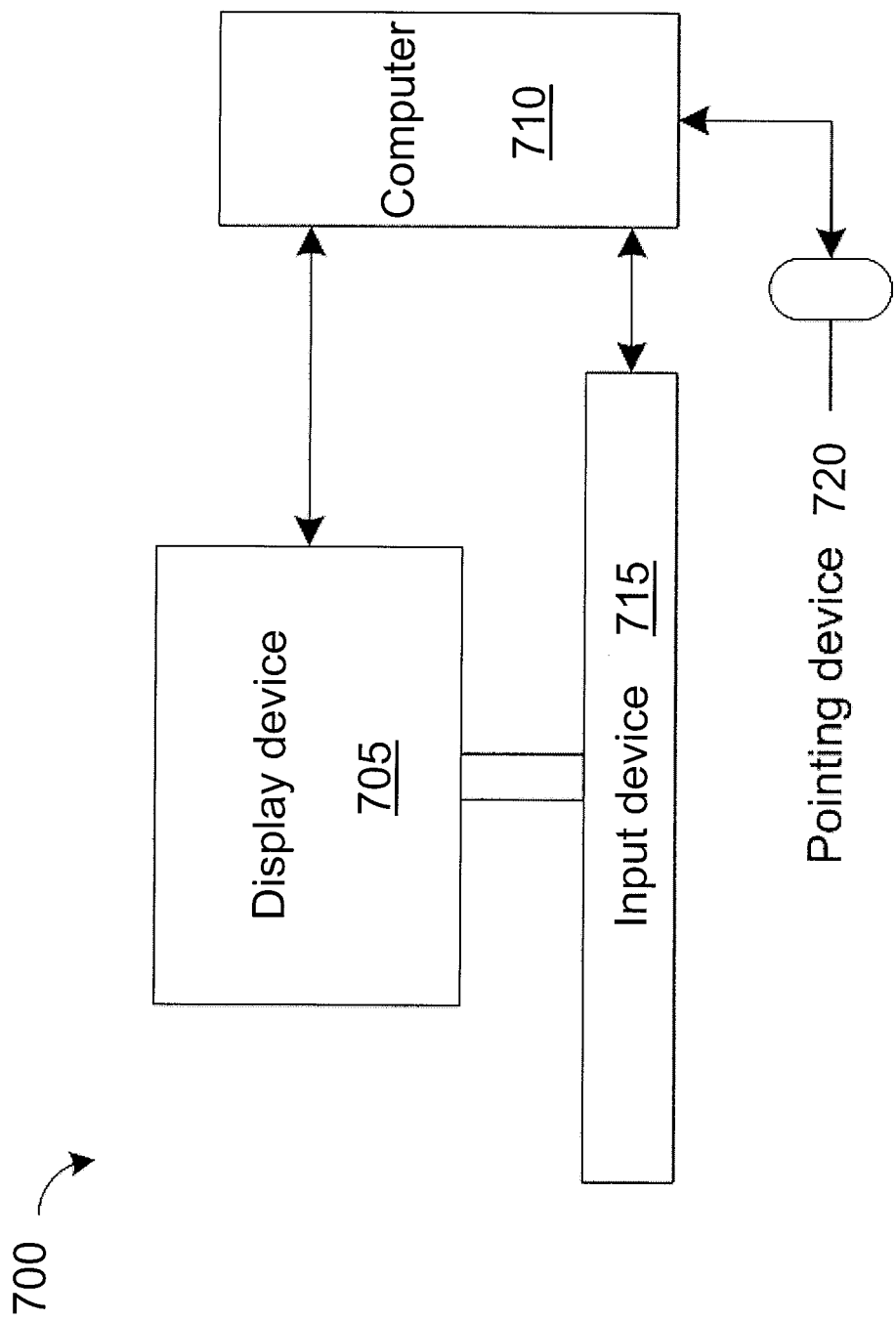
FIG. 7 shows a schematic diagram of an exemplary computer system that can be utilized to implement the systems and methods described herein.

FIG. 7 is a schematic diagram of an example computer system 700 that can be utilized to implement the systems and methods described herein. The computer system 700 includes a display device 705, a computer 710, an input device 715, and a pointing device 720. The software can be implemented in any suitable computer system 700 (e.g., desktop computer, laptop computer, personal digital assistant (PDA), smartphone, or work station). Information can be displayed to a user using any suitable display device 705 including a cathode ray tube (CRT) and liquid crystal display (LCD) monitor. A user can use an input device 715 and any suitable pointing device 720 (e.g., mouse, joystick, track ball, stylus, touch screen) to interact with the audio editing software application. The display device 705, the input device 715, and the pointing device 720 can be operatively coupled with the computer 710 through wired or wireless means.

The audio editing software application can be executed by a central processing unit (CPU) within the computer 710 in accordance with an operating system, such as the Macintosh Operating System (Mac OS) X. The audio editing software application also can be executed on a computer system 700 hosting any other operating system, such as Microsoft Windows, UNIX, and Linux. The computer system 700 can be a stand-alone device such as a desktop computer. Alternatively, the computer system 700 can be implemented in a networked environment, where the audio editing software application is installed on a centralized server and accessed by a user through one or more nodes, such as work stations. The computer system 700 can display output on the display device 705.

The computer 710 can include a microprocessor, one or more communications busses and/or interfaces, a random access memory (RAM) and a read only memory (ROM). The microprocessor can perform the operations specified by a user based on user input and instructions from RAM or ROM or both. In addition, the computer 710 can include a storage device to store content including raw footage recorded using a recording instrument, as well as edited video and audio clips, and other additional content. The storage device can reside in the computer 710. Alternatively, the storage device can reside external to the computer 710. Also, the storage device can reside in the recording instrument. The recording instrument can be operatively coupled to the computer 710 through wired or wireless means to retrieve stored content.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, a keyboard, and a pointing device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although implementations have been described in detail above, other modifications are possible. For example, the flow diagram depicted in the figures do not require the particular order shown, or sequential order, to achieve desirable results. In addition, other steps may be provided, or steps may be eliminated, from the described flow diagrams, and other components may be added to, or removed from, the described systems. Accordingly, various modifications may be made to the disclosed implementations and still be within the scope of the following claims.

What is claimed is:

1. A computer-implemented method comprising:
displaying a first audio clip in a first row of a user interface, the first audio clip represented by a first bounded region of the first row;
displaying a second audio clip in a second row of the user interface vertically displaced from the first row, the second audio clip represented by a second bounded region of the second row;
displaying a first transition point identifier associated with the first audio clip, wherein the first transition point identifier designates a first portion corresponding to the first audio clip that extends from a beginning of the first audio clip to the first transition point identifier;
displaying a second transition point identifier associated with the second audio clip, wherein the second transition point identifier designates a second portion corresponding to the second audio clip that extends from the second transition point identifier to an end of the second audio clip, and wherein the second transition point identifier is vertically aligned with the first transition point identifier associated with the first audio clip; and
generating a combined audio clip comprising the first portion corresponding to the first audio clip and the second portion corresponding to the second audio clip.

2. The method of claim 1, wherein a first plurality of indicators is associated with the first audio clip, the method comprising:
detecting a selection of an indicator in the first audio clip; and
associating the first transition point identifier with the selected indicator, comprising distinguishing the selected indicator from others in the first plurality of indicators by associating a graphical symbol with the selected indicator.

3. The method of claim 1, further comprising:
playing the first audio clip from the beginning to the first transition point identifier; and
playing the second audio clip from the second transition point identifier to the end.

4. The method of claim 1, comprising:
presenting an audio transition marker linking the first transition point identifier and the second transition point identifier.

5. The method of claim 4, comprising:
displaying in the user interface a first video clip corresponding to the first audio clip and a second video clip corresponding to the second audio clip, wherein the first video clip is displayed in conjunction with the first audio clip and the second video clip is displayed in conjunction with the second audio clip; and displaying in the user interface a video transition marker that intersects the first and second video clips, wherein the video transition marker is aligned with the audio transition marker.

6. The method of claim 5, comprising:

moving the first transition point identifier to an indicator associated with the first audio clip that visually precedes the video transition marker;

aligning the second transition point identifier with the first transition point identifier such that the audio transition marker precedes the video transition marker; and in response to receiving user input, simultaneously initiating playback of the first video clip and the first audio clip, wherein playback of the first audio clip transitions to playback of the second audio clip upon encountering the audio transition marker while the first video clip is playing.

7. The method of claim 5, comprising:

moving the first transition point identifier to an indicator associated with the first audio clip that is subsequent to the video transition marker;

aligning the second transition point identifier with the first transition point identifier such that the audio transition marker is subsequent to the video transition marker; and in response to receiving user input, simultaneously initiating playback of the first video clip and the first audio clip, wherein playback of the first video clip transitions to playback of the second video clip upon encountering the video transition marker while the first audio clip is playing.

8. The method of claim 4, wherein the audio transition marker includes a vertical bar that intersects the first audio clip and the second audio clip.

9. The method of claim 1, further comprising saving the combined audio clip to a file.

10. The method of claim 1, further comprising displaying at least one of a preceding audio clip to the left of the first audio clip and a succeeding audio clip to the right of the first audio clip.

11. The method of claim 10, comprising visually distinguishing the first audio clip from other audio clips that precede or succeed the first audio clip.

12. A computer-implemented method comprising:

displaying in a user interface display region a plurality of bounded regions each representing respective audio clips including at least a first bounded region representing a first audio clip and a second bounded region representing a second audio clip, wherein the second audio clip is vertically displaced from the first audio clip;

displaying in the user interface display region a transition marker that intersects the first and second bounded regions, the transition marker defining a first transition point in the first audio clip and a second transition point in the second audio clip that is vertically aligned with the first transition point, the first transition point corresponding to a first intersection of the transition marker and the first bounded region and the second transition point corresponding to a second intersection of the transition marker and the second bounded region; and receiving user input to alter one or both of the first and second transition points by visually effecting relative movement between one or more of the first audio clip, the second audio clip and the transition marker.

13. The method of claim 12, further comprising displaying an edited audio clip comprising a portion of the first audio clip ending at the first transition point followed by a portion of the second audio clip beginning at the second transition point.

14. A computer program product, encoded on a non-transitory computer readable medium, operable to cause data processing apparatus to perform operations comprising:

displaying a first audio clip in a first row of a user interface, the first audio clip represented by a first bounded region of the first row;

displaying a second audio clip in a second row of the user interface vertically displaced from the first row, the second audio clip represented by a second bounded region of the second row;

displaying a first transition point identifier associated with the first audio clip, wherein the first transition point identifier designates a first portion corresponding to the first audio clip that extends from a beginning of the first audio clip to the first transition point identifier;

displaying a second transition point identifier associated with the second audio clip, wherein the second transition point identifier designates a second portion corresponding to the second audio clip that extends from the second transition point identifier to an end of the second audio clip, and wherein the second transition point identifier is vertically aligned with the first transition point identifier associated with the first audio clip; and generating a combined audio clip comprising the first portion corresponding to the first audio clip and the second portion corresponding to the second audio clip.

15. The computer program product of claim 14, wherein a first plurality of indicators is associated with the first audio clip, and wherein the computer program product is operable to cause data processing apparatus to perform operations comprising:

detecting a selection of an indicator in the first audio clip; and associating the first transition point identifier with the selected indicator, comprising distinguishing the selected indicator from others in the first plurality of indicators by associating a graphical symbol with the selected indicator.

16. The computer program product of claim 14, further operable to cause data processing apparatus to perform operations comprising:

playing the first audio clip from the beginning to the first transition point identifier; and playing the second audio clip from the second transition point identifier to the end.

17. The computer program product of claim 14, operable to cause data processing apparatus to perform operations comprising presenting an audio transition marker linking the first transition point identifier and the second transition point identifier.

18. The computer program product of claim 17, operable to cause data processing apparatus to perform operations comprising:

displaying in the user interface a first video clip corresponding to the first audio clip and a second video clip corresponding to the second audio clip, wherein the first video clip is displayed in conjunction with the first audio clip and the second video clip is displayed in conjunction with the second audio clip; and displaying in the user interface a video transition marker that intersects the first and second video clips, wherein the video transition marker is aligned with the audio transition marker.

19. The computer program product of claim 18, operable to cause data processing apparatus to perform operations comprising:
moving the first transition point identifier to an indicator associated with the first audio clip that visually precedes the video transition marker;
aligning the second transition point identifier with the first transition point identifier such that the audio transition marker precedes the video transition marker; and
in response to receiving user input, simultaneously initiating playback of the first video clip and the first audio clip, wherein playback of the first audio clip transitions to playback of the second audio clip upon encountering the audio transition marker while the first video clip is playing.

20. The computer program product of claim 18, operable to cause data processing apparatus to perform operations comprising:
moving the first transition point identifier to an indicator associated with the first audio clip that is subsequent to the video transition marker;
aligning the second transition point identifier with the first transition point identifier such that the audio transition marker is subsequent to the video transition marker; and
in response to receiving user input, simultaneously initiating playback of the first video clip and the first audio clip, wherein playback of the first video clip transitions to playback of the second video clip upon encountering the video transition marker while the first audio clip is playing.

21. The computer program product of claim 17, wherein the audio transition marker includes a vertical bar that intersects the first audio clip and the second audio clip.

22. The computer program product of claim 14, further operable to cause data processing apparatus to perform operations comprising saving the combined audio clip to a file.

23. The computer program product of claim 14, further operable to cause data processing apparatus to perform operations comprising presenting at least one of a preceding audio clip to the left of the first audio clip and a succeeding audio clip to the right of the first audio clip.

24. The computer program product of claim 23, operable to cause data processing apparatus to perform operations comprising visually distinguishing the first audio clip from other audio clips that precede or succeed the first audio clip.

25. A computer program product, encoded on a non-transitory computer readable medium, operable to cause data processing apparatus to perform operations comprising:
displaying in a user interface display region a plurality of bounded regions each representing respective audio clips including at least a first bounded region representing a first audio clip and a second bounded region representing a second audio clip, wherein the second audio clip is vertically displaced from the first audio clip;
displaying in the user interface display region a transition marker that intersects the first and second bounded regions, the transition marker defining a first transition point in the first audio clip and a second transition point in the second audio clip that is vertically aligned with the first transition point, the first transition point corresponding to a first intersection of the transition marker and the first bounded region and the second transition point corresponding to a second intersection of the transition marker and the second bounded region; and
receiving user input to alter one or both of the first and second transition points by visually effecting relative movement between one or more of the first audio clip, the second audio clip and the transition marker.

26. The computer program product of claim 25, further operable to cause data processing apparatus to perform operations comprising presenting an edited audio clip comprising a portion of the first audio clip ending at the first transition point followed by a portion of the second audio clip beginning at the second transition point.

27. A system comprising:
a processor; and
a computer readable medium storing a computer program for editing audio segments, the computer program comprising instructions to cause the processor to perform operations comprising:
displaying a first audio clip in a first row of a user interface, the first audio clip represented by a first bounded region of the first row;
displaying a second audio clip in a second row of the user interface vertically displaced from the first row, the second audio clip represented by a second bounded region of the second row;
displaying a first transition point identifier associated with the first audio clip, wherein the first transition point identifier designates a first portion corresponding to the first audio clip that extends from a beginning of the first audio clip to the first transition point identifier;
displaying a second transition point identifier associated with the second audio clip, wherein the second transition point identifier designates a second portion corresponding to the second audio clip that extends from the second transition point identifier to an end of the second audio clip, and wherein the second transition point identifier is vertically aligned with the first transition point identifier associated with the first audio clip; and
generating a combined audio clip comprising the first portion corresponding to the first audio clip and the second portion corresponding to the second audio clip.

28. The system of claim 27, wherein a first plurality of indicators is associated with the first audio clip, the operations comprising:
detecting a selection of an indicator in the first audio clip; and
associating the first transition point identifier with the selected indicator, comprising distinguishing the selected indicator from others in the first plurality of indicators by associating a graphical symbol with the selected indicator.

29. The system of claim 27, the operations further comprising:
playing the first audio clip from the beginning to the first transition point identifier; and
playing the second audio clip from the second transition point identifier to the end.

30. The system of claim 27, the operations comprising presenting an audio transition marker linking the first transition point identifier and the second transition point identifier.

31. The system of claim 30, the operations comprising:
displaying in the user interface a first video clip corresponding to the first audio clip and a second video clip corresponding to the second audio clip, wherein the first video clip is displayed in conjunction with the first audio clip and the second video clip is displayed in conjunction with the second audio clip; and displaying in the user interface a video transition marker that intersects the first and second video clips, wherein the video transition marker is aligned with the audio transition marker.

32. The system of claim 31, the operations comprising:
moving the first transition point identifier to an indicator associated with the first audio clip that visually precedes the video transition marker;
aligning the second transition point identifier with the first transition point identifier such that the audio transition marker precedes the video transition marker; and
in response to receiving user input, simultaneously initiating playback of the first video clip and the first audio clip, wherein playback of the first audio clip transitions to playback of the second audio clip upon encountering the audio transition marker while the first video clip is playing.

33. The system of claim 31, the operations comprising:
moving the first transition point identifier to an indicator associated with the first audio clip that is subsequent to the video transition marker;
aligning the second transition point identifier with the first transition point identifier such that the audio transition marker is subsequent to the video transition marker; and
in response to receiving user input, simultaneously initiating playback of the first video clip and the first audio clip, wherein playback of the first video clip transitions to playback of the second video clip upon encountering the video transition marker while the first audio clip is playing.

34. The system of claim 30, wherein the audio transition marker includes a vertical bar that intersects the first audio clip and the second audio clip.

35. The system of claim 27, the operations further comprising saving the combined audio clip to a file.

36. The system of claim 27, the operations further comprising displaying at least one of a preceding audio clip to the left of the first audio clip and a succeeding audio clip to the right of the first audio clip.

37. The system of claim 36, the operations comprising visually distinguishing the first audio clip from other audio clips that precede or succeed the first audio clip.

38. A system comprising:
a processor; and
a computer readable medium storing a computer program for editing audio segments, the computer program comprising instructions to cause the processor to perform operations comprising:
displaying in a user interface display region a plurality of bounded regions each representing respective audio clips including at least a first bounded region representing a first audio clip and a second bounded region representing a second audio clip, wherein the second audio clip is vertically displaced from the first audio clip;
displaying in the user interface display region a transition marker that intersects the first and second bounded regions, the transition marker defining a first transition point in the first audio clip and a second transition point in the second audio clip that is vertically aligned with the first transition point, the first transition point corresponding to a first intersection of the transition marker and the first bounded region and the second transition point corresponding to a second intersection of the transition marker and the second bounded region; and
receiving user input to alter one or both of the first and second transition points by visually effecting relative movement between one or more of the first audio clip, the second audio clip and the transition marker.

39. The system of claim 38, the operations further comprising displaying an edited audio clip comprising a portion of the first audio clip ending at the first transition point followed by a portion of the second audio clip beginning at the second transition point.

40. The method of claim 1, wherein an indicator includes an amplitude component that represents an audio signal value at a point in time corresponding to the indicator.

41. The method of claim 12, wherein at least one of the first and second bounded regions display indicators within the bounded regions, the indicators indicating time instants and also representing data used to generate corresponding audio clips, the data including an amplitude component that represents an audio signal value at a point in time.

42. A computer-implemented method comprising:
displaying in a user interface a first audio clip and a second audio clip, the first audio clip represented by a first bounded region of the user interface and the second audio clip represented by a second bounded region of the user interface that is vertically displaced from the first bounded region;
displaying a first transition point identifier associated with the first audio clip that identifies a first portion from a beginning of the first audio clip to the first transition point identifier that is playable;
displaying a second transition point identifier associated with the second audio clip that identifies a second portion from the second transition point identifier to an end of the second audio clip that is playable, wherein the second transition point identifier is vertically aligned with the first transition point identifier; and
generating a third audio clip by combining the first portion and the second portion as non-overlapping contiguous sections of the third audio clip.

* * * * *